US006570583B1

(12) United States Patent
Kung et al.

(10) Patent No.: US 6,570,583 B1
(45) Date of Patent: May 27, 2003

(54) ZOOM-ENABLED HANDHELD DEVICE

(75) Inventors: Shao-Tsu Kung, Taipei (TW); Ming-Hsun Chou, Taipei (TW)

(73) Assignee: Compal Electronics, Inc., Taipei (TW)

( * ) Notice: Subject to any disclaimer, the term of this patent is extended or adjusted under 35 U.S.C. 154(b) by 386 days.

(21) Appl. No.: 09/664,585

(22) Filed: Sep. 18, 2000

(51) Int. Cl.$^7$ ............................ G09G 5/00; A63F 13/00
(52) U.S. Cl. .......................................... 345/661; 463/37
(58) Field of Search ................. 345/660, 661, 345/666, 667, 668, 669, 801; 455/566

(56) References Cited

U.S. PATENT DOCUMENTS

| | | | | |
|---|---|---|---|---|
| 5,227,771 A | * | 7/1993 | Kerr et al. .................. 345/800 |
| 5,249,049 A | * | 9/1993 | Kranawetter et al. ....... 348/473 |
| 5,475,399 A | * | 12/1995 | Borsuk ........................ 345/472 |
| 5,557,728 A | * | 9/1996 | Garrett et al. ............... 345/801 |
| 5,615,384 A | * | 3/1997 | Allard et al. ................ 345/800 |
| 5,644,335 A | * | 7/1997 | Mielekamp .................. 345/667 |
| 5,710,947 A | * | 1/1998 | Teremy et al. ................ 396/26 |
| 5,717,939 A | * | 2/1998 | Bricklin et al. ............. 707/503 |
| 5,754,873 A | * | 5/1998 | Nolan ......................... 707/527 |
| 5,815,160 A | * | 9/1998 | Kikuchi et al. ............. 345/661 |
| 5,952,994 A | * | 9/1999 | Ong et al. ................... 345/668 |
| 6,009,336 A | * | 12/1999 | Harris et al. ................ 455/566 |
| 6,037,954 A | * | 3/2000 | McMahon ................... 345/169 |
| 6,067,070 A | * | 5/2000 | Suzuki et al. ............... 345/660 |
| 6,073,036 A | * | 6/2000 | Heikkinen et al. .......... 455/575 |
| 6,081,277 A | * | 6/2000 | Kojima ....................... 345/661 |
| 6,091,956 A | * | 7/2000 | Hollenberg ................. 455/456 |
| 6,144,358 A | * | 11/2000 | Narayanaswamy et al. . 345/102 |
| 6,160,926 A | * | 12/2000 | Dow et al. .................. 382/313 |
| 6,175,782 B1 | * | 1/2001 | Obradovich et al. .......... 701/1 |
| 6,208,342 B1 | * | 3/2001 | Mugura et al. ............. 345/810 |
| 6,211,856 B1 | * | 4/2001 | Choi et al. .................. 345/666 |
| 6,295,088 B1 | * | 9/2001 | Tsukahara et al. ..... 348/333.06 |
| 6,347,997 B1 | * | 2/2002 | Armstrong .................... 463/37 |
| 6,404,584 B2 | * | 6/2002 | Armstrong .................... 360/92 |
| 6,407,749 B1 | * | 6/2002 | Duke .......................... 345/684 |
| 6,441,854 B2 | * | 8/2002 | Fellegara et al. ....... 348/333.13 |
| 2001/0050691 A1 | * | 12/2001 | Komata ....................... 345/667 |

\* cited by examiner

*Primary Examiner*—Michael Razavi
*Assistant Examiner*—Ryan Yang
(74) *Attorney, Agent, or Firm*—Winston Hsu

(57) ABSTRACT

A handheld device has a display for presenting an image to a user, a processor electrically connected to the display, memory electrically connected to the processor, and an input panel electrically connected to the processor. The input panel has a number of keys for generating key signals, and a zoom control device for generating a zoom control signal. The display is used to present both text and iconic information to the user. A display program, held in the memory, will change the font size of displayed text or icons according to the zoom control signal. When doing so, the display program selects a proper amount of text or icons to be displayed within the boundary of the display, and arranges the selected text or icons within the display.

5 Claims, 7 Drawing Sheets

ZOOM-ENABLED HANDHELD DEVICE

BACKGROUND OF THE INVENTION

1. Field of the Invention

The present invention relates to a handheld device with a display that can zoom in or out according to a signal received from a zoom control device. More specifically, a handheld device that changes font and icon sizes according to input received from a zoom control device is disclosed.

2. Description of the Prior Art

Handheld devices with displays for presenting visual information have become increasingly common. Notable examples of such devices include cellular telephones and personal data assistants (PDA). These devices can present such information as telephone numbers, names, messages, addresses, stock quotes, etc. This information is typically in the form of text, icons, or a mixture of the two. For example, when presenting a telephone number, the device may display only a number, which would be text-only information. Or, it may display the telephone number next to a small image of a telephone, which is a mixture, then, of both text and icons. Icons are useful for quickly communicating simple ideas or information to the user:

Please refer to FIG. 1. FIG. 1 is a diagram of a cellular telephone displaying a list of telephone numbers 12. The list of telephone numbers 12 is shown on a display 14. As the display 14 is quite small, only a single name and number can be shown at a time. Consequently, to find and view a particular name, the user most page up or down the list a name at a time. This can be quite inconvenient if the list of telephone numbers 12 is long. If the text used to display the list of telephone numbers 12 were slightly smaller, it would be possible to display more names and numbers per display entry. This would lessen the number of times the user would have to page up or down to find the desired name and number.

At the other extreme, text or icons displayed in a handheld device may be too small to be conveniently read or viewed. Please refer to FIG. 2. FIG. 2 is a diagram of a PDA 20. The PDA 20 is displaying lines of text 22 on a display 24. The size of the text 22 has been made quite small so that a sufficient number of lines may be squeezed onto the display 24. Unfortunately, this can make the text 22 nearly unreadable.

Several methods have been adopted to overcome these problems. For cellular telephones and PDAs alike, the most common method has been to provide options to change the scale, or point size, of the displayed font. Generally speaking, selecting a larger font makes for easier reading of text, but with a corresponding reduction in the amount of information that can be viewed at one time on the display. Conversely, smaller font sizes permit more information to be taken in at a glance on the display, but are more difficult to read. In either case, the user must work his or her way through various menu options on the cellular telephone or PDA to effect the change in font size. This action is tedious for the user, and must be repeated any time the user wishes to change the font size.

SUMMARY OF THE INVENTION

It is therefore a primary objective of this invention to provide a handheld device with zoom functionality that is controlled by a dedicated zoom input device. The zoom input device is used to change the size of displayed text and icons.

The present invention, briefly summarized, discloses a handheld device with a display for presenting an image to a user, a processor electrically connected to the display, memory electrically connected to the processor, and an input panel electrically connected to the processor. The input panel has a number of keys for generating key signals, and a zoom control device for generating a zoom control signal. The display is used to present both text and iconic information to a user. A display program, held in the memory, will change the font size of displayed text or icons according to the zoom control signal. When doing so, the display program selects a proper amount of text or icons to be displayed within the boundary of the display, and arranges the selected text or icons within the display.

It is an advantage of the present invention that the zoom control device, in conjunction with the display program, allows the user to quickly change the size of text and icons on the display. This enables the user to quickly zoom out to view more information on the display, or zoom in to more easily read the displayed information.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
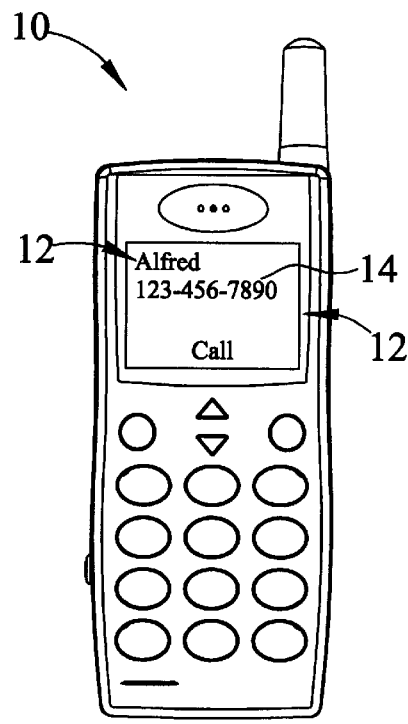
FIG. 1 is a diagram of a prior art cellular telephone displaying a list of telephone numbers.
Figure 2:
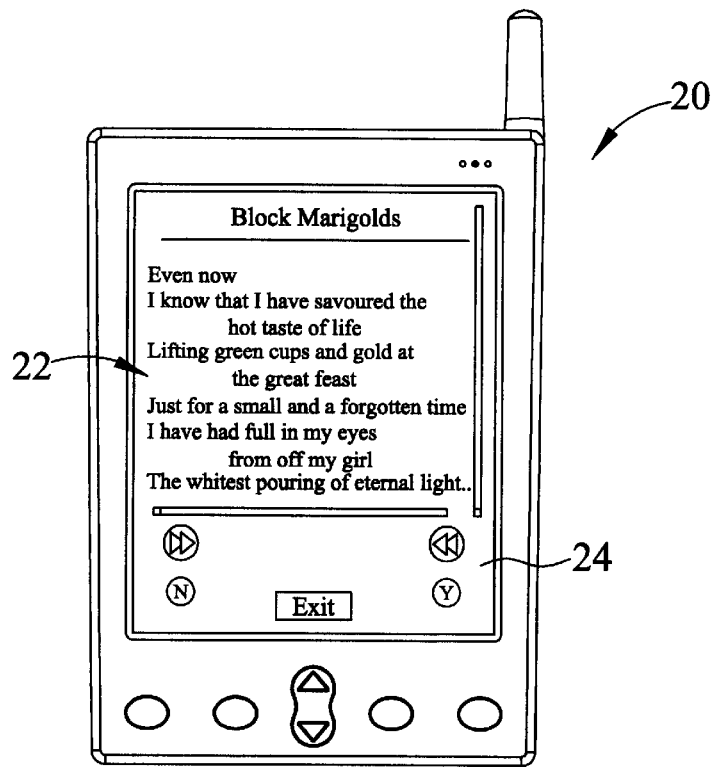
FIG. 2 is a diagram of a prior art PDA displaying information.
Figure 3:
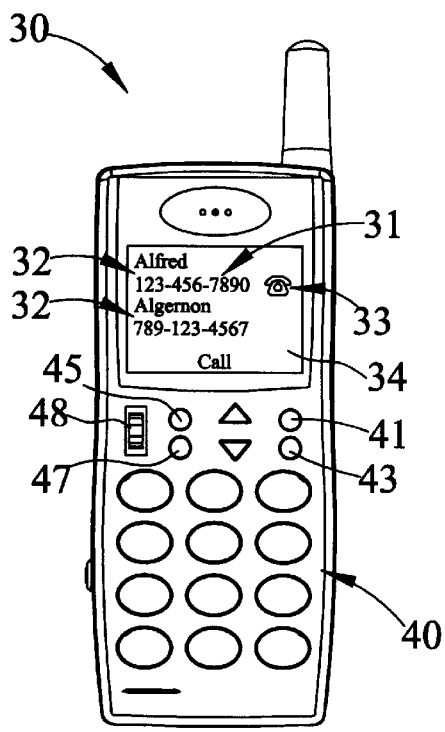
FIG. 3 is a diagram of a first embodiment handheld device according to the present invention.
Figure 4:
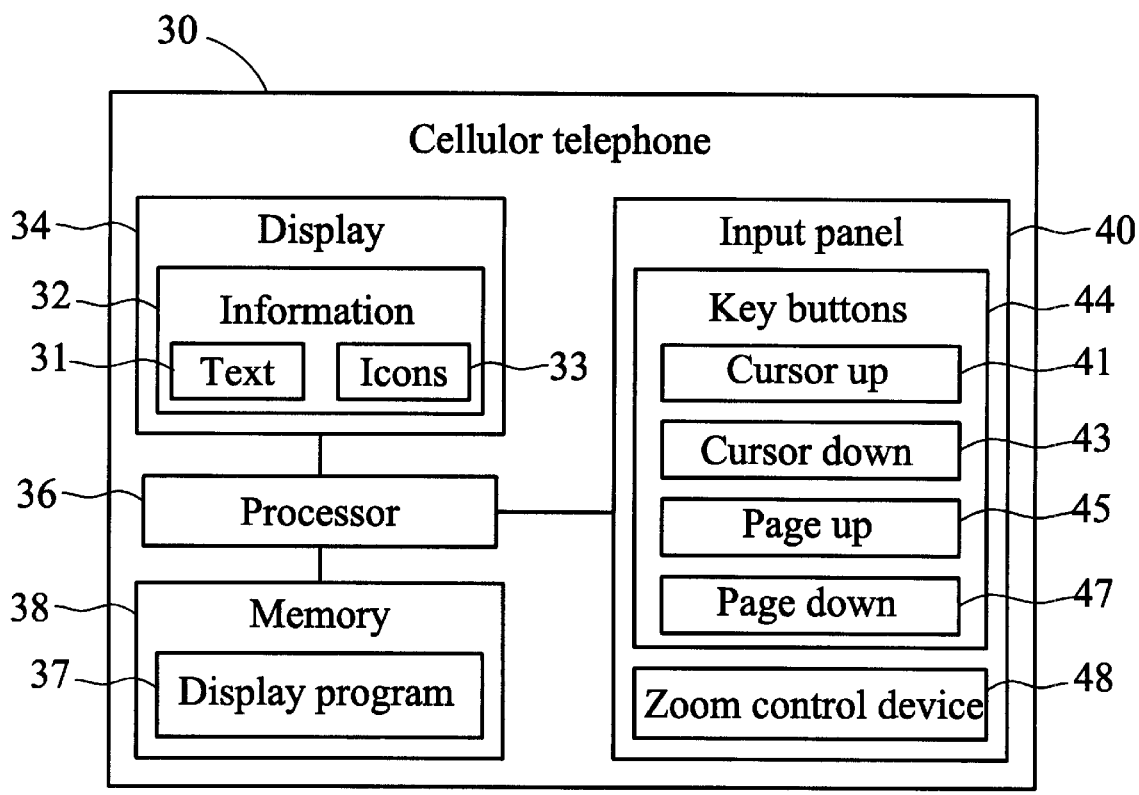
FIG. 4 is a functional block diagram of the handheld device of FIG. 3.

Please refer to FIG. 3 and FIG. 4. FIG. 3 is a diagram of a first embodiment handheld device according to the present invention, a cellular telephone 30. FIG. 4 is a functional block diagram of the cellular telephone 30. The cellular telephone 30 comprises a display 34, a processor 36, memory 38 electrically connected to the processor 36 and an input panel 40, which is also. electrically connected to the processor 36. The display 34 is used to display information images 32, which can contain textual information 31 or iconic information 33. The text 31 and graphic icons 33 together form the images 32 that are presented to the user on the display 34. The contents of the images 32 are controlled by the processor 36. The processor 36 is, in turn, controlled by a display program 37 held in the memory 38. Consequently, the display program 37 is responsible for properly displaying and formatting the information images 32 shown on the display 34.

The input panel 40 comprises a plurality of key buttons 44 and a zoom control device 48. For this embodiment, the zoom control device 48 is a knob that may be rotated forward or backward to generate zoom in or zoom out signals. In principle, though, the zoom control device 48 could be any input device that would enable the user to generate zoom in and zoom out signals, such as a sliding button, two independent buttons or a bi-directional push button. The key buttons provide additional key signals. For example, the buttons can provide scrolling and paging signals, via a cursor up button 41, a cursor down button 43, a page up button 45 and a page down button 47. The display program 37 processes the zoom in, zoom out and key signals.

Figure 5:
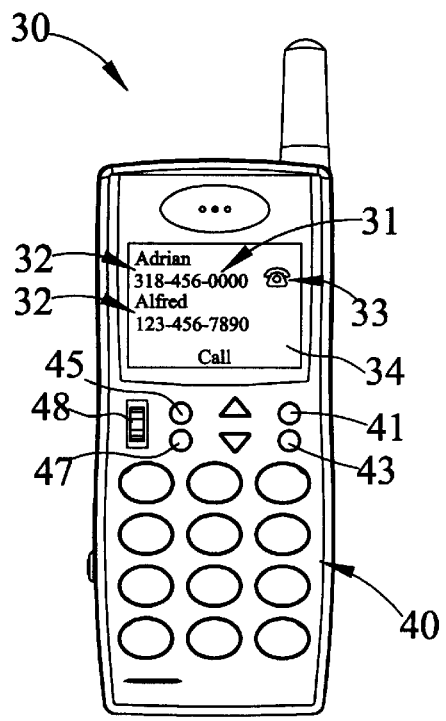
FIG. 5 depicts the handheld device of FIG. 3 after a cursor up button has been pressed.

The icon 33 is used to inform the user which telephone number will be called when a call button is pressed on the input panel 40. Please refer to FIG. 5. FIG. 5 depicts the cellular telephone 30 of FIG. 3 after the cursor up button 41 has been pressed. The cursor up button 41 and cursor down button 43 are used to move the icon 33 up or down, respectively, a line of information 32. In FIG. 3, the icon 33 is already at the top line of information 32. Consequently, by pressing the cursor up button 41, the display program 37 determines that the contents of the display 34 must be scrolled down and reformatted to display a new line of information 32. This is shown in FIG. 5. Of course, the cursor down button 43 would behave in an analogous manner, causing the display program 37 to scroll up the contents of the display 34 when the icon 33 is at the bottom line of information 32.

Similarly, the cellular telephone 30 is equipped with the page up and page down buttons 45 and 47, respectively. These buttons cause the display program to replace the current contents of the display 34 with entirely new lines of information 32. The new lines of information 32 would be either information immediately preceding or succeeding the current contents of the display 34. The functionality of both the paging 45, 47 and scrolling 41, 43 keys are well known in the art, and need not be gone into here with any more detail.

The present invention cellular telephone 30, however, has the zoom control knob 48 that provides new functionality and convenience for the user. By rotating the zoom control knob 48 backwards, zoom out signals are sent to the processor 36. This causes the display program 37 to reduce the size of the font used to display the lines of text 31, and reduce the size of the icon 33. The smaller font size enables more lines of information 32 to be shown on the display 34, and it is up to the display program 37 to determine how to present the information on the display 34.

Figure 6:
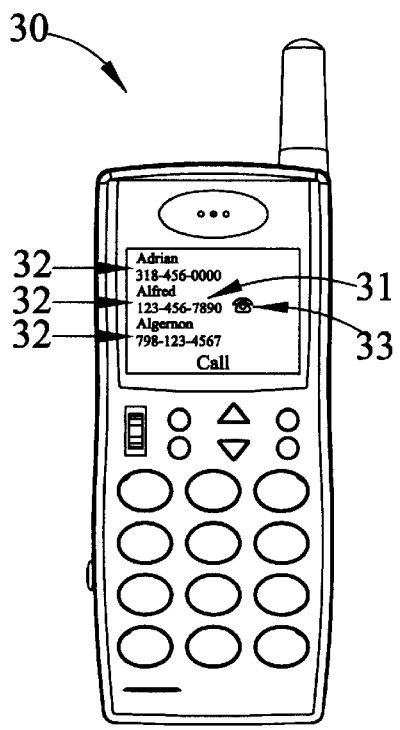
FIG. 6 depicts the handheld device of FIG. 3 after a zoom out signal has been received.

Various methods can be employed to reformat and display the contents of the display 34. The present invention cellular telephone 30 tends to zoom out and zoom in around the line of information 32 that contains the icon 33. For example, when the user rotates the zoom control knob 48 to zoom out the contents displayed in FIG. 3, it is possible that the smaller font size will permit an additional line of information 32 to be shown on the display 34. This additional line of information 32 would appear above the line 32 with the icon 33. This is depicted in FIG. 6. Note that in FIG. 6 both the size of the text 31 and icon 33 are reduced. By continuing to rotate the zoom control knob 48, the user can zoom out the contents of the display 34 farther and farther. Additional lines of information 32 would appear at the top and bottom of the display 34, tending to cause the line of information 32 that has the icon 33 to move towards the center of the display 34.

Figure 7:
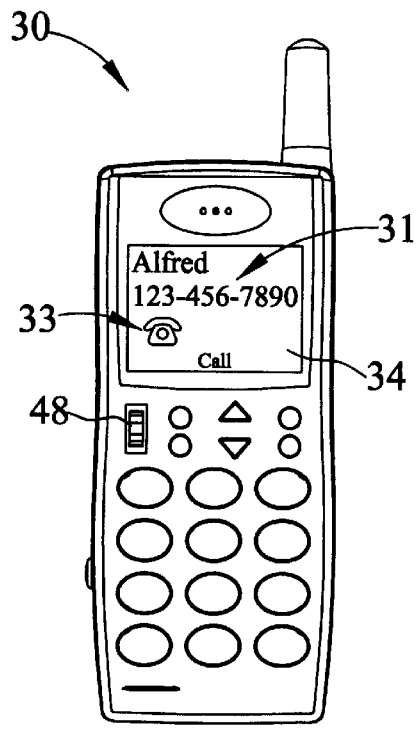
FIG. 7 depicts the handheld device of FIG. 3 after a zoom in signal has been received.

Similarly, the user can rotate the zoom control knob forward to zoom in on the contents of the display 34. The results of such an action performed on the cellular telephone 30 depicted in FIG. 3 is shown in FIG. 7. Both the size of the text 31 and icon 33 are increased. When zooming in, the possibility exists that the information to be shown will be too large to fit within the boundary of the display 34. For example, the line of text 31 may be too long to fit within the display 34. Two options in such situations are possible: clipping or wrapping. Clipping simply entails discarding information that does not fit within the boundary of the display 34. Wrapping involves a reformatting of the text and icons, creating extra lines of information that would not normally be present, to squeeze all of the information onto the display 34. The display program 37 uses wrapping when zooming in so that as much information as possible is presented to the user. Wrapping, however, may not always work, and under such conditions clipping may be employed.

Figure 8:
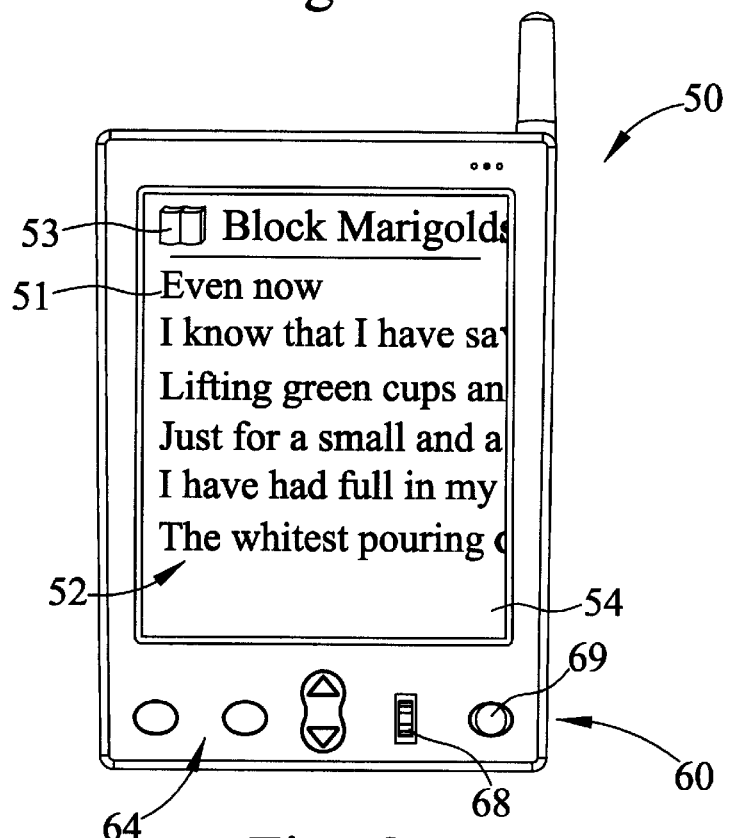
FIG. 8 depicts a second embodiment handheld device according to the present invention.
Figure 9:
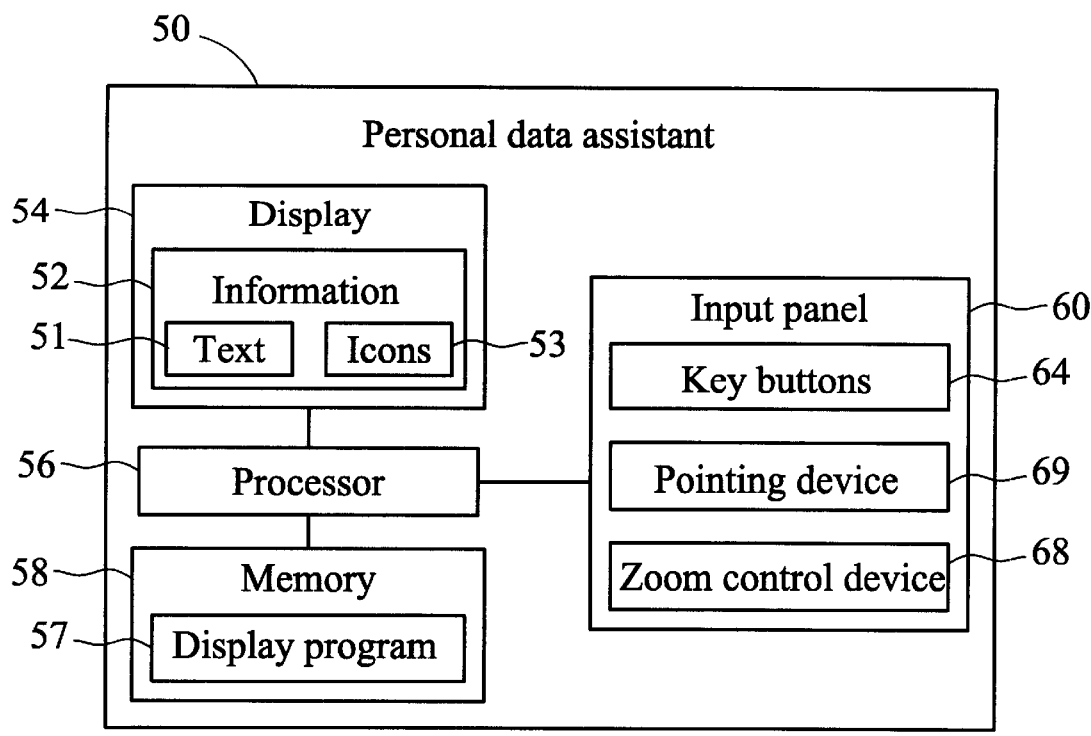
FIG. 9 is a functional block diagram of the handheld device of FIG. 8.

To better illustrate the different methods that may be employed when zooming in or out the display of a handheld device, consider FIG. 8, which depicts a second embodiment of the present invention, a personal data assistant (PDA) 50, and FIG. 9, which is a functional block diagram of the PDA 50.

The PDA 50 comprises a display 54, a processor 56, memory 58 electrically connected to the processor 56 and an input panel 60, which is also electrically connected to the processor 56. The display 54 is used to display information images 52, which can contain textual information 51 or iconic information 53. The contents of the images 52 are controlled by the processor 56. The processor 56 is, as in the previous embodiment, controlled by a display program 57 held in the memory 58. The display program 57 is responsible for properly displaying and formatting the information images 52 shown on the display 54.

The input panel 60 comprises key buttons 64, a zoom control device 68 and a pointing device 69. Like the previous embodiment of the cellular telephone, the zoom control device 68 of the PDA 50 is a knob that can be rotated forward to zoom in the display 54, or rotated backwards to zoom out the display 54. Of course, the zoom control device 68 could be any other suitable input device, and could even be a touch-sensitive graphic on the display 54 of the PDA 50. The pointing device 69 generates pointing signals that are processed by the display program 57. These pointing signals cause the display program 57 to scroll the information 52 on the display in an appropriate manner. A trackball is used for the pointing device 69, but any other suitable device could be used, such as a touch pad, a pointing stick, etc. The key buttons 64 generate key signals, such as page up, page down, home or end signals.

Figure 10:
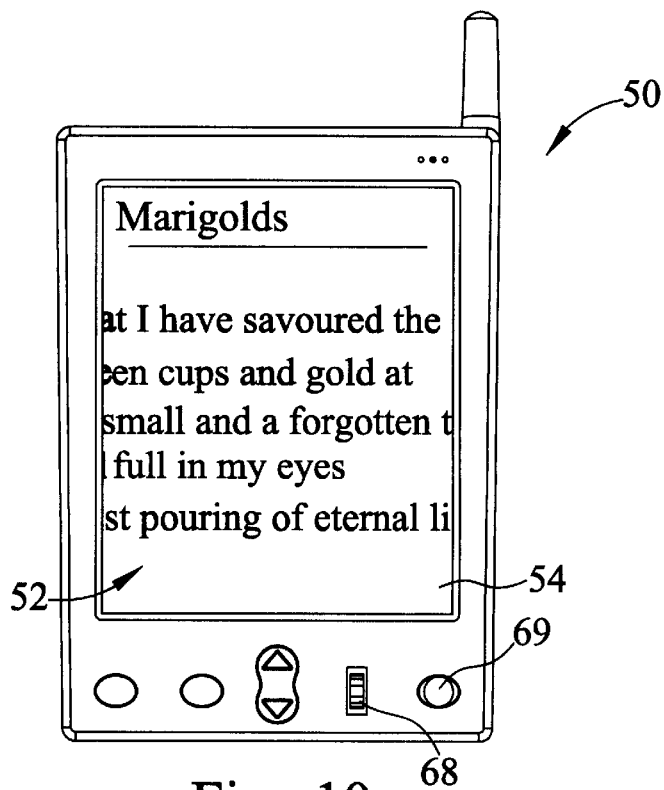
FIG. 10 depicts the handheld device of FIG. 8 after receiving left scroll signals from a pointing device.

The display 54 can contain both text 51 and icons 53. The information 52 shown on the display 54 is zoomed in so far that much of it has been clipped off at the boundary of the display 54. However, by using the pointing device 69, the clipped portions can be brought into view. For example, if the user rolls the trackball 69 to the right, left scroll signals are generated that cause the clipped portions to the right of the display 54 to be brought into view, while other portions on the left of the display 54 are clipped out of view. This is depicted in FIG. 10, which is a diagram of the PDA 50 of FIG. 8 after receiving left scroll signals from the pointing device 69. In a similar manner, the user can also use the pointing device 69 to scroll the information 52 on the display 54 up, down or to the right.

Figure 11:
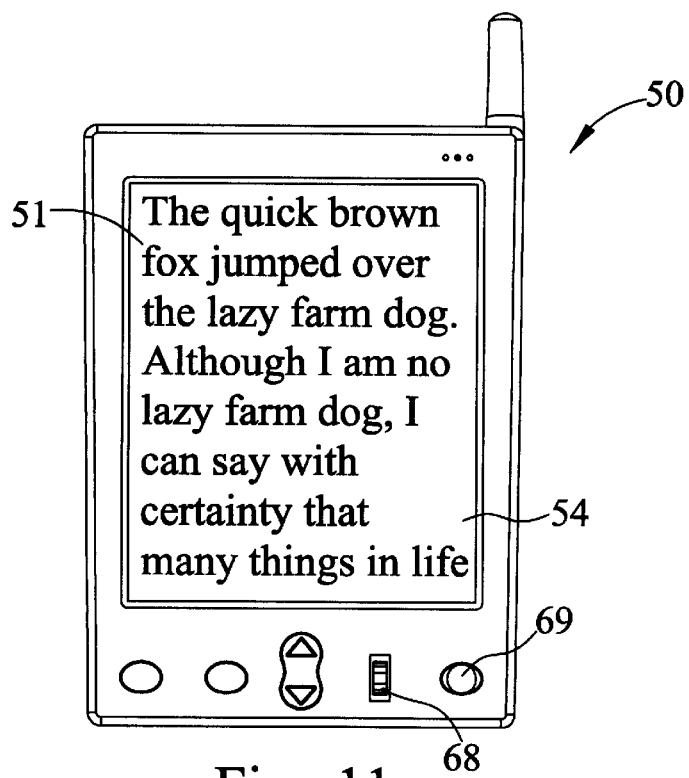
FIG. 11 depicts the handheld device of FIG. 8 displaying several long lines of text.
Figure 12:
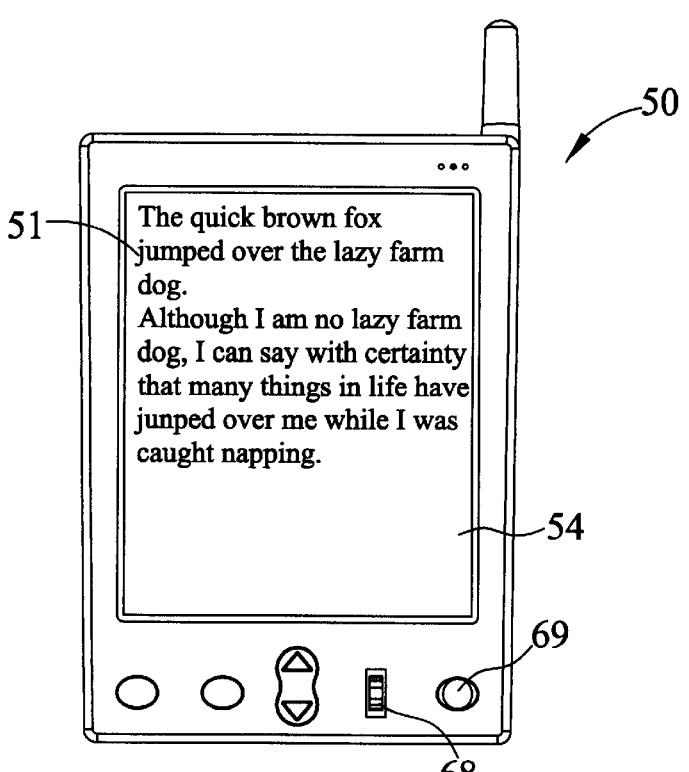
FIG. 12 depicts the handheld device of FIG. 11 after receiving a zoom out signal from a zoom control knob.

In both FIG. 8 and FIG. 10 clipping is used when showing the information 52 on the display 54. By using the pointing device 69, information that is off the display 54 can be brought into view. Clipping, however, is not always desirable. There are times when a user desires that as much information as possible, both text and icons, be presented on the display 54, without it being clipped and unreadable off the edges of the display 54. In this case, word wrapping is employed. Consider FIG. 11, which depicts the PDA 50 displaying several long lines of text 51. Each sentence is not clipped but instead wraps around and down to a new line, breaking at word boundaries, much as text in a word processor does. When the user uses the zoom control knob 68 to zoom out, it becomes possible to display both more words per line, and more lines per display 54. Consequently, more unclipped information is presented. This is shown in FIG. 12, which is a diagram of the PDA 50 of FIG. 11 after receiving a zoom out signal from the zoom control knob 68.

For either embodiment of the present invention, when the zoom control device 68, 48 is used to increase or decrease the size of text 51, 31 or icons 53, 33, it is necessary that the display program 57, 37 properly format the information 52, 32 shown on the display 54, 34. As discussed above, either clipping or word wrapping may be employed. In either case, the display program 57, 37 must select an appropriate amount of text and icons around the zooming point, format the selected text and icons based upon the displaying method being used, and then present this formatted information on the display 54, 34. Generally speaking, the display program 57, 37 may select a point of interest as the zooming point, such as a cursor, or it may simply choose the upper left corner of the display 54, 34 as the zooming point, which is a reasonable choice for most text-based applications.

Figure 13:
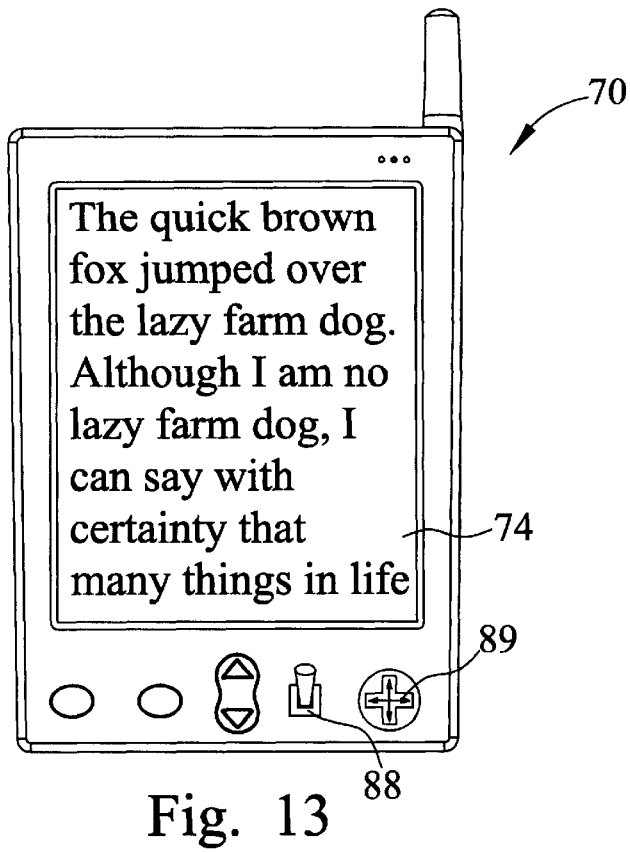
FIG. 13 is a third embodiment of the present invention.

Please refer to FIG. 13, which is a third embodiment of the present invention, a PDA 70. Although the PDA 70 is used to exemplify the spirit of the third embodiment of the present invention, it should be clear to any reasonably skilled in the art that the invention could also be equally well used in a cellular telephone, or other similar handheld device. In all aspects the PDA 70 is identical to the second embodiment PDA 50 except for a change in the input devices of the PDA 70. Rather than using a knob or wheel that can be rolled forwards or backwards to effect the zooming of the display 74, a bidirectional switch 88 is used. The switch 88 can be pushed forward to zoom in, or pulled back to zoom out. The longer the switch 88 is held in a pushed forward or pulled back state, the more the display 74 will be zoomed in or zoomed out. This creates a smooth feel for the user, analogous to the lens zooming of a camera. Also, rather than using a trackball, a two-dimensional rocking switch 89 is used to generate the pointing signals. The rocking switch 89 can be rocked left and right, or up and down to generate corresponding left, right, up or down pointing signals.

Figure 14:
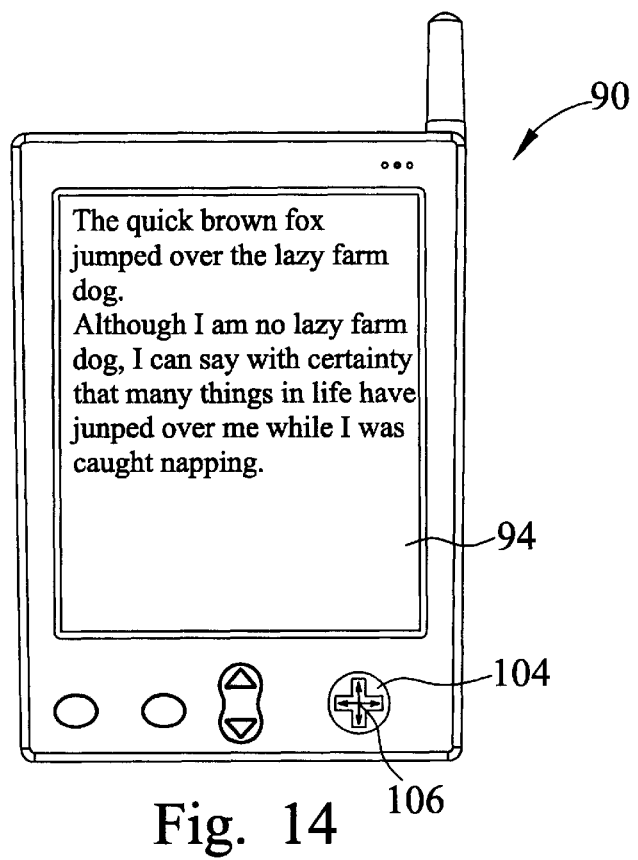
FIG. 14 is a fourth embodiment of the present invention.

Please refer to FIG. 14. FIG. 14 is a fourth embodiment of the present invention, a PDA 90. The PDA 90 is nearly identical to the PDA 70 except that the zoom control device has been incorporated into the pointing device. The pointing device 104 is a two-dimensional rocking switch, similar to that of the third embodiment PDA 70. However, a pressure-sensitive switch (not shown) is disposed under the central portion 106 of the rocking switch 104. A user may rock the switch 104 left, right, up or down without necessarily activating the pressure sensitive switch. However, by directing a firm enough force on the central portion 106 of the rocking switch 104, the pressure-sensitive switch can be activated. By holding the rocking switch 104 down, and thereby keeping the pressure-sensitive switch activated, zoom signals are sent that cause the display 94 to either continuously zoom in or zoom out. By toggling the pressure-sensitive switch (i.e., by releasing pressure on the switch, and then activating it again), the user can toggle between zoom states, i.e., whether zoom in or zoom out signals are delivered by the pressure-sensitive switch. Alternatively, the pressure sensitive switch, in conjunction with the rocking action of the rocker switch 104, can be used to send the zoom control signals. For example, when the pressure-sensitive switch is activated and the rocker switch 104 is rocked forward, the display 94 may zoom in. When the pressure sensitive switch is activated and the rocker switch 104 is rocked backwards, the display 94 may zoom out. In this manner, a single input device can send both two-dimensional pointing signals, as well as zoom in and zoom out signals.

In contrast to the prior art, the present invention utilizes a zoom control device that permits a user to quickly and easily enlarge or shrink the size of text and icons shown on the display of the handheld device. Additionally, the handheld device may have a pointing device that can be used to quickly effect scrolling of display. The zoom control device makes it easier for the user to zoom out to quickly see more information on the display, or zoom in to more easily read information on the display. In conjunction with the pointing device, the user can quickly and easily scan through information.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A handheld device comprising:

a display for presenting an image to a user, the image containing text or a plurality of graphic icons;

a processor electrically connected to the display;

memory electrically connected to the processor, the memory comprising a display program for controlling the display of the handheld device; and an input panel electrically connected to the processor and comprising a plurality of key buttons for generating key signal, a two-dimensional rocking switch for generating pointing signals, and a switch for generating a zoom control signal according to the user's input being activate when the two-dimensional rocking switch is depresses near an origin of axes of the two-dimensional rocking switch;

wherein the display program will change the font size of the text or the size of the graphic icons according to the zoom control signal, select a proper amount of text or graphic icons to be displayed within the boundary of the display, and scroll the text or graphic icons presented on the display according to the pointing signals received from the two dimensional rocking switch.

2. The handheld device of claim 1 wherein the text is in a word format and all the words and graphic icons presented on the display are completely displayed within the boundary of the display.

3. The handheld device of claim 1 wherein the switch is use to toggle between a first zoom state and a second zoom state.

4. The handheld device of claim 1 wherein when the switch is activated the two-dimensional rocking switch is used to generate the zoom control signal.

5. The handheld device of claim 1 wherein the handheld device is a personal data assistant (PDA) or a cellular telephone.

* * * * *